April 28, 1936.　　　　E. M. SHANNON　　　　2,038,610
ROLLER BEARING TRAILER TRUCK
Filed Sept. 29, 1933　　　2 Sheets-Sheet 1
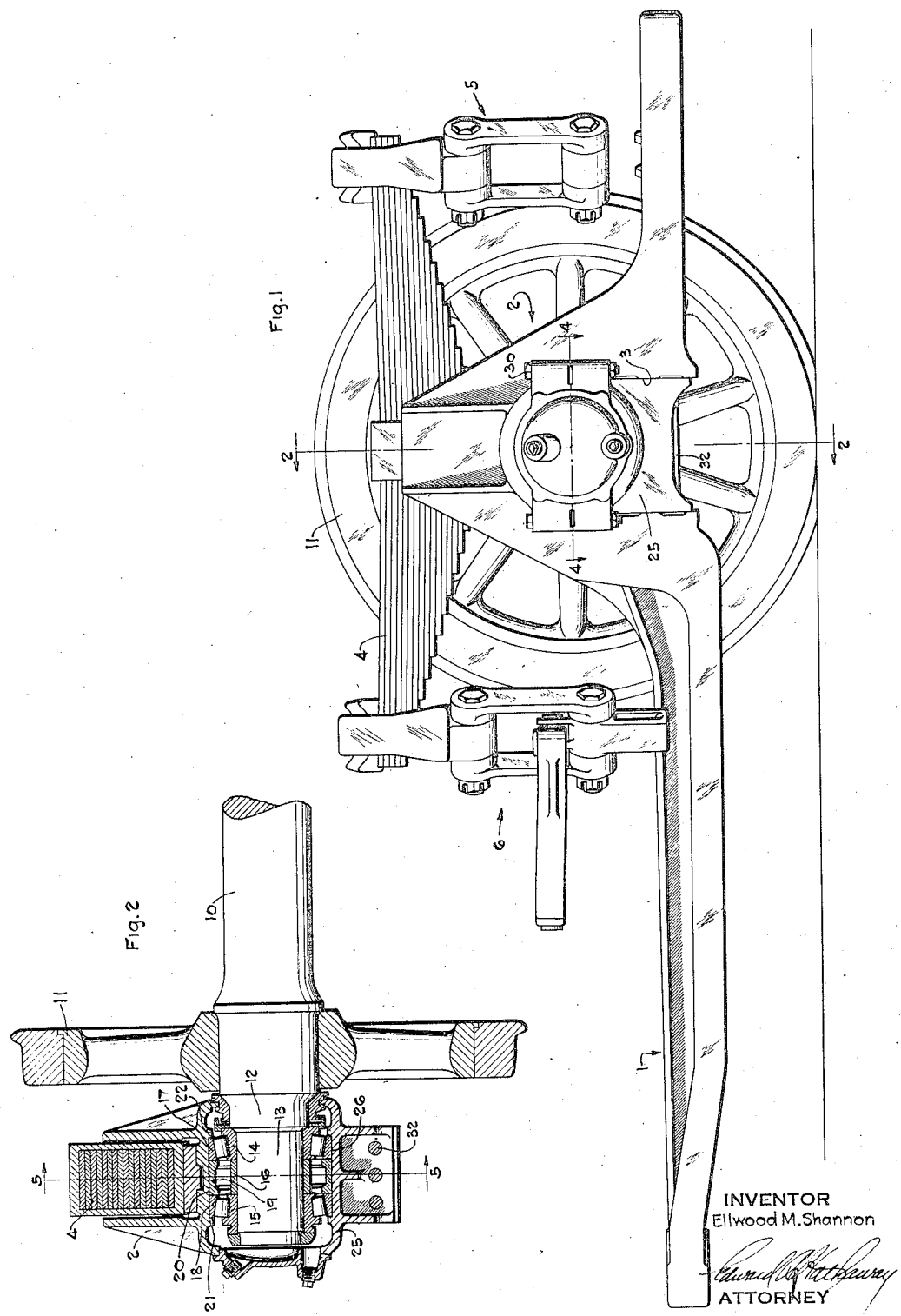
INVENTOR
Ellwood M. Shannon
ATTORNEY

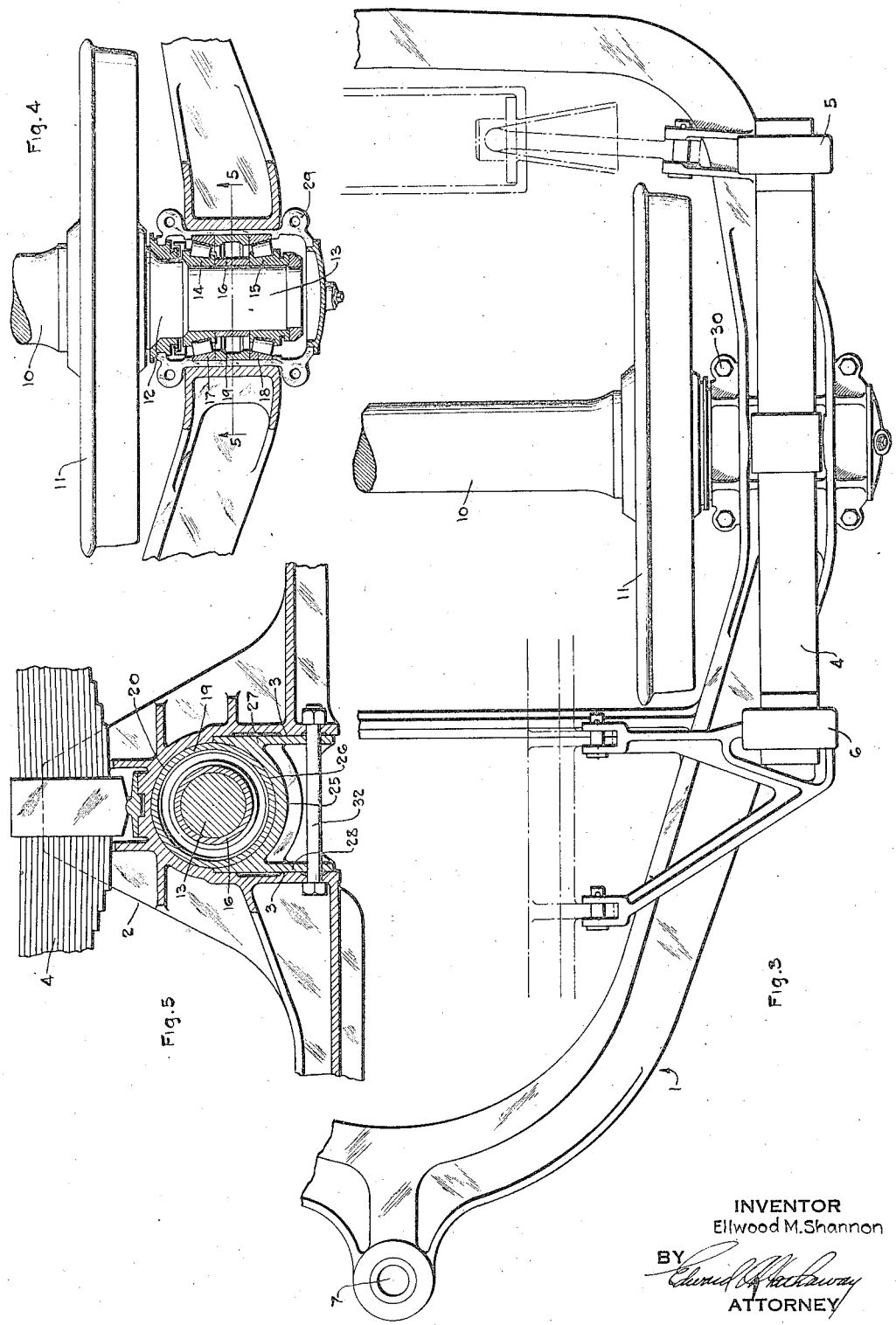

Patented Apr. 28, 1936

2,038,610

UNITED STATES PATENT OFFICE 2,038,610

ROLLER BEARING TRAILER TRUCK

Ellwood M. Shannon, Bala, Pa.

Application September 29, 1933, Serial No. 691,462

5 Claims. (Cl. 105—219)

This invention relates generally to trucks and more particularly to an improved locomotive trailer truck employing roller bearings.

A great many types of locomotive trailer trucks have heretofore been proposed including those of roller bearing design but the same have been deficient in various respects including either excessive manufacturing costs or maintenance or in some cases have been excessively heavy without a corresponding increase of strength and stability. This is particularly true in roller bearing trucks where relatively large roller bearing housings and supports therefor must be utilized for a proper size roller bearing.

It is one object of my invention to provide an improved trailer truck of the roller bearing type. Another object is to provide in a truck an improved roller bearing housing and means for supporting the bearing therein so as to require minimum size of the truck frame near the pedestals while at the same time maintaining maximum strength. In one aspect of the invention I accomplish the foregoing by having at least a portion of the frame directly constitute part of the roller bearing housing in the form of an arch connecting the pedestals to receive and hold the bearing races in position while an improved lower housing cooperates with said upper housing portion, this lower housing being secured in an improved manner to the frame so as to provide a very strong and compact arrangement which will be economical in manufacture and maintenance together with efficient operation.

Other objects and advantages will be more apparent to those skilled in the art from the following description oif the accompanying drawings in which:

Fig. 1 is a side elevation of my improved truck;

Fig. 2 is a vertical section taken substantially on the line 2—2 of Fig. 1;

Fig. 3 is a plan view of one-half of the truck of Fig. 1;

Fig. 4 is a sectional plan view taken substantially on the line 4—4 of Fig. 1;

Fig. 5 is a vertical longitudinal section taken substantially on the lines 5—5 of Figs. 2 and 4.

In the particular embodiment of the invention which is shown herein merely for the purpose of illustrating one specific form among others that the invention might take in practice, I have provided a trailer truck frame generally indicated at 1 adapted to have any suitable form or shape including side and end members, this truck being specifically shown as integrally cast. A portion of the truck generally indicated at 2 is raised or arched to provide what normally would be pedestal guides 3 while a spring seat and guide are provided on the top of arch 2 to receive a spring 4. It will be understood that the truck is symmetrical about its longitudinal center line and hence the disclosure of one side thereof will suffice. The locomotive may be connected to the truck and springs as through any usual linkages 5 and 6 and a bolt to be received in eye 7.

An axle 10 carrying any suitable wheels 11 has a series of successively reduced portions 12 and 13. The portion 13 receives the inner races or cones 14 and 15 while a sleeve 16 spaces the cones, although it will of course be understood that any suitable or desired type of roller bearing construction may be employed. However, in my improved arrangement the outer races or cups 17 and 18, spaced by a sleeve 19, are not provided with a usual upper bearing housing but instead are directly supported by the truck frame in the upper end or arch of the pedestal guides 3. It will be noted as indicated at 20, Figs. 2 and 5 that this surface 20 is semi-cylindrical and is provided with flanges 21 and 22 for laterally holding the bearing cups in position.

The lower half of the bearings is supported by a housing 25 having a semi-cylindrical seat 26 to receive the lower half of said bearing cups. The sides of this housing are provided with vertical legs or surfaces generally indicated at 27 and 28 slidably supported by the pedestals. As is shown in Figs. 1, 3 and 4, lugs 29 are provided on the lower housing 25 to receive vertical bolts 30 extending through similar lugs cast integral with the truck frame. The arrangement and appearance of the lower housing and pedestal guides provide what appears to be a complete removable roller bearing housing but which in fact is only partly the case due to the upper portion of said housing being formed as an integral part of the truck frame. There are also provided horizontal pedestal bolts 32 specifically shown as 3 in number in Fig. 2. These bolts pass through suitable vertical flanges or webs of the frame and also through the legs 27 and 28 of the lower housing 25 and serve the function of preventing undue stresses or tendency to spread the pedestal legs.

From the foregoing disclosure it is seen that I have provided an extremely simple, compact and sturdy arrangement for supporting and housing a roller bearing in a trailer truck. Also that the truck not only directly provides the upper housing for the roller bearing but in addition directly functions through flanges 21 and 22 to maintain the bearing in its neutral position together with the aid of corresponding flanges on the lower removable housing 25. Hence it is seen that my improved arrangement is highly effective in permitting low cost of manufacture and maintenance while at the same time presenting an organization of parts that is highly efficient in operation and requires minimum size of the pedestal arch and frame adjacent thereto. It is also seen that the roller bearings take the lateral thrust and hence no hub wear plates are required such as are ordinarily required in friction journals.

It will of course be understood that various changes in details of construction and arrangement of parts may be made by those skilled in the art without departing from the spirit of the invention as set forth in the appended claims.

I claim:

1. A truck frame having pedestal guides each terminating at their upper ends in a semi-cylindrical surface, a roller bearing seated on said surface, said pedestals projecting downwardly below the lowermost portion of said bearing, and means disposed within and guided by said pedestals for holding said bearing immovably against said surface.

2. A truck frame having pedestal guides each terminating at their upper end in a semi-cylindrical surface, a roller bearing immovably seated on said surface, said pedestals projecting downwardly to the lower portion of said bearing, a lower removable housing disposed between and guided by said downwardly projecting pedestal portions and engaging the under side of said roller bearing, and means for securing said lower housing to said downwardly projecting pedestal portions for positively holding the roller bearing in position.

3. A truck frame having pedestal guides each terminating at their upper end in a semi-cylindrical surface and ears projecting laterally therefrom, a roller bearing immovably seated on said surface, said pedestals projecting downwardly to the lower portion of said bearing, a lower housing disposed within and guided by said downwardly projecting pedestal portions and having a semi-cylindrical surface engaging the under side of said bearing, and vertical bolts connecting said housing to said ears to positively hold said roller bearing in a fixed position relative to said frame.

4. A truck frame having pedestal guides each terminating at their upper end in a semi-cylindrical surface, a roller bearing immovably seated on said surface, said pedestals having legs projecting downwardly below the lowermost portion of said bearing, a lower housing having a semi-cylindrical surface engaging the under side of said bearing to positively hold the same in fixed relation to the frame, and a horizontal pedestal bolt extending through the legs of said pedestal and said housing.

5. A truck frame having pedestal guides each terminating at their upper end in a semi-cylindrical surface, a roller bearing seated on said surface, said pedestals projecting downwardly to the lower portion of said bearing, means disposed in and guided by said downwardly projecting pedestal portions for holding said bearing immovably against said surface, and semi-circular flanges formed integrally with said frame around said surface to laterally hold said bearing.

ELLWOOD M. SHANNON.